US011956317B2

(12) United States Patent
Gero et al.

(10) Patent No.: US 11,956,317 B2
(45) Date of Patent: Apr. 9, 2024

(54) UNIFIED, BROWSER-BASED ENTERPRISE COLLABORATION PLATFORM

(71) Applicant: Akamai Technologies, Inc., Cambridge, MA (US)

(72) Inventors: Charles E. Gero, Quincy, MA (US); Thomas Houman, Beverly, MA (US); Abhijit C. Mehta, Mountain View, CA (US); Greg Burd, Cambridge, MA (US); Vladimir Shtokman, Cambridge, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 18/106,905

(22) Filed: Feb. 7, 2023

(65) Prior Publication Data

US 2023/0188606 A1    Jun. 15, 2023

Related U.S. Application Data

(63) Continuation of application No. 17/074,676, filed on Oct. 20, 2020, now Pat. No. 11,575,753, which is a (Continued)

(51) Int. Cl.
*G06F 15/16* (2006.01)
*H04L 65/10* (2022.01)
(Continued)

(52) U.S. Cl.
CPC .......... *H04L 67/14* (2013.01); *H04L 65/1013* (2013.01); *H04L 65/1093* (2013.01);
(Continued)

(58) Field of Classification Search
CPC . H04L 67/12; H04L 65/1013; H04L 65/1093; H04L 65/40; H04L 65/4015;
(Continued)

(56) References Cited

U.S. PATENT DOCUMENTS

| 9,769,536 | B2* | 9/2017 | Bergstrom | ............ H04L 45/125 |
| 2016/0171090 | A1* | 6/2016 | Schwartz | ................ G06F 16/35 |
| | | | | 707/730 |
| 2017/0142170 | A1* | 5/2017 | Sylvain | ............... H04L 65/4038 |

* cited by examiner

*Primary Examiner* — Normin Abedin
(74) *Attorney, Agent, or Firm* — David H. Judson

(57) ABSTRACT

A system for enterprise collaboration is associated with an overlay network, such as a content delivery network (CDN). The overlay network comprises machines capable of ingress, forwarding and broadcasting traffic, together with a mapping infrastructure. The system comprises a front-end application, a back-end application, and set of one or more APIs through which the front-end application interacts with the back-end application. The front-end application is a web or mobile application component that provides one or more collaboration functions. The back-end application comprises a signaling component that maintains state information about each participant in a collaboration, a connectivity component that manages connections routed through the overlay network, and a multiplexing component that manages a multi-peer collaboration session to enable an end user peer to access other peers' media streams through the overlay network rather than directly from another peer. Peers preferably communicate with the platform using WebRTC. A collaboration manager component enables users to configure, manage and control their collaboration sessions.

9 Claims, 4 Drawing Sheets

Related U.S. Application Data continuation of application No. 15/857,781, filed on Dec. 29, 2017, now Pat. No. 10,812,598.

(60) Provisional application No. 62/440,626, filed on Dec. 30, 2016.

(51) Int. Cl.
*H04L 65/1093* (2022.01)
*H04L 65/40* (2022.01)
*H04L 65/401* (2022.01)
*H04L 65/403* (2022.01)
*H04L 67/104* (2022.01)
*H04L 67/1042* (2022.01)
*H04L 67/14* (2022.01)
*H04N 21/00* (2011.01)

(52) U.S. Cl.
CPC .......... *H04L 65/40* (2013.01); *H04L 65/4015* (2013.01); *H04L 65/403* (2013.01); *H04L 67/104* (2013.01); *H04L 67/1042* (2013.01); *H04N 21/00* (2013.01)

(58) Field of Classification Search
CPC . H04L 65/403; H04L 67/104; H04L 67/1042; H04N 21/10
See application file for complete search history.

UNIFIED, BROWSER-BASED ENTERPRISE COLLABORATION PLATFORM

BACKGROUND

Technical Field

This application relates generally to cloud-based collaboration among users of computing machines.

Brief Description of the Related Art

Real-time communications (e.g., videoconferencing, shared document editing, screen sharing, and the like) over the Internet have been a part of our daily lives at work and at home. That said, many of the existing technical solutions are not interoperable, and there are still difficult technical problems (e.g., NAT traversal) that can stymie direct peer-to-peer connections, thus dictating the use of relays to ensure connectivity. When relays are overloaded, call quality suffers. Further, multi-party video conferencing typically requires a separate connection for each pair of users, and this approach does not scale.

WebRTC, an Internet standard, was created to make videoconferencing and point-to-point data transfer easier to implement. In particular, WebRTC (which stands for Web Real Time Communications) seeks to take the most critical elements of video chat and move them to one of the most commonly used tools for accessing the Internet, namely, a web browser. WebRTC is supported with plugins by both Google Chrome and Mozilla Firefox. It allows the browser to access the client machine's camera and microphone, provides a method for establishing a direct connection between two users' browser and to use that connection to send audio and video, and it provides a method for sending arbitrary data streams across a connection. WebRTC also mandates that all data is encrypted.

While WebRTC provides significant advantages, it does not itself address the scaling challenges associated with connectivity across NAT and multi-party conferencing. Thus, for example, a relay infrastructure (using TURN) is needed to establish connections between two peers behind NATs, and building a robust and scalable relay infrastructure is challenging. Additionally, multi-user video conferencing over WebRTC requires full mesh connectivity between all users; that is, a separate connection must be established between each pair of users. Each user needs to upload their video (and other data) multiple times—once for each peer—and the resources required grow in a way proportional to the square of the number of users, which does not scale. These issues are not limited to WebRTC; indeed, existing, dedicated video conferencing solutions struggle with the same problems. For example, Microsoft's Skype relays are often overloaded, significantly impacting the quality of Skype calls that cannot use a direct peer-to-peer connection. Another common solution, LifeSize, needs the same full-mesh connectivity described above, which severely limits the number of different remote sites that can participate in one meeting.

The remains a need to enhance the performance, reliability and scalability of WebRTC and to provide a ubiquitous platform for real-time collaboration.

BRIEF SUMMARY

A system for enterprise collaboration is associated with an overlay network, such as a content delivery network (CDN) or other cloud-accessible architecture. In a representative implementation, the overlay network comprises machines capable of ingress, forwarding and broadcasting traffic, together with a mapping infrastructure. The system comprises a front-end application, a back-end application, and set of one or more APIs through which the front-end application interacts with the back-end application. The front-end application is a web or mobile application component that provides one or more collaboration functions. The back-end application comprises a signaling component that maintains state information about each participant in a collaboration, a connectivity component that manages connections routed through the overlay network, and a multiplexing component that manages a multi-peer collaboration session to enable an end user peer to access other peers' media streams through the overlay network rather than directly from another peer. Peers preferably communicate with the platform using WebRTC. A collaboration manager component enables users to configure, manage and control their collaboration sessions.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
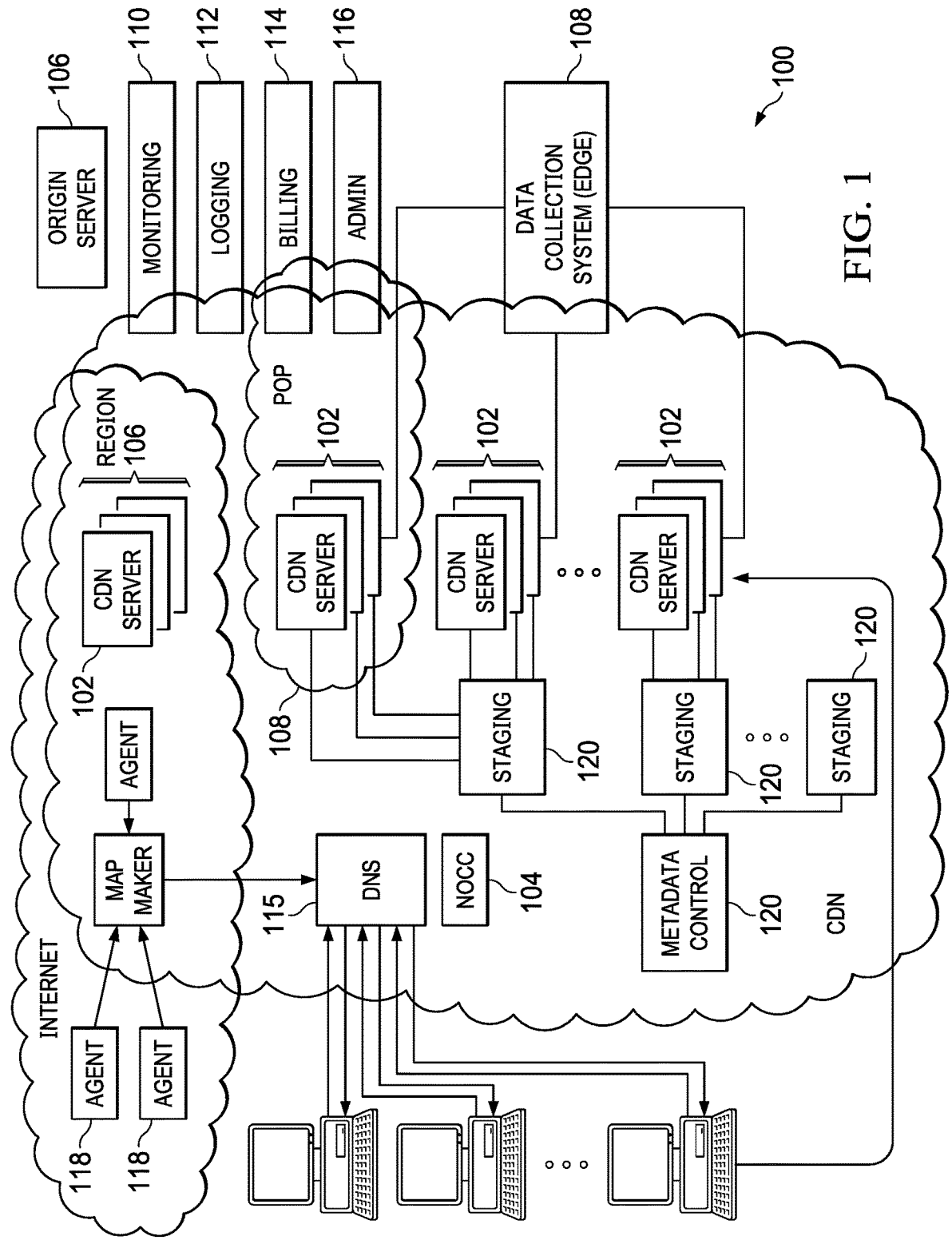
FIG. 1 is a block diagram illustrating a known distributed computer system configured as a content delivery network (CDN)

In a known system, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or subdomains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
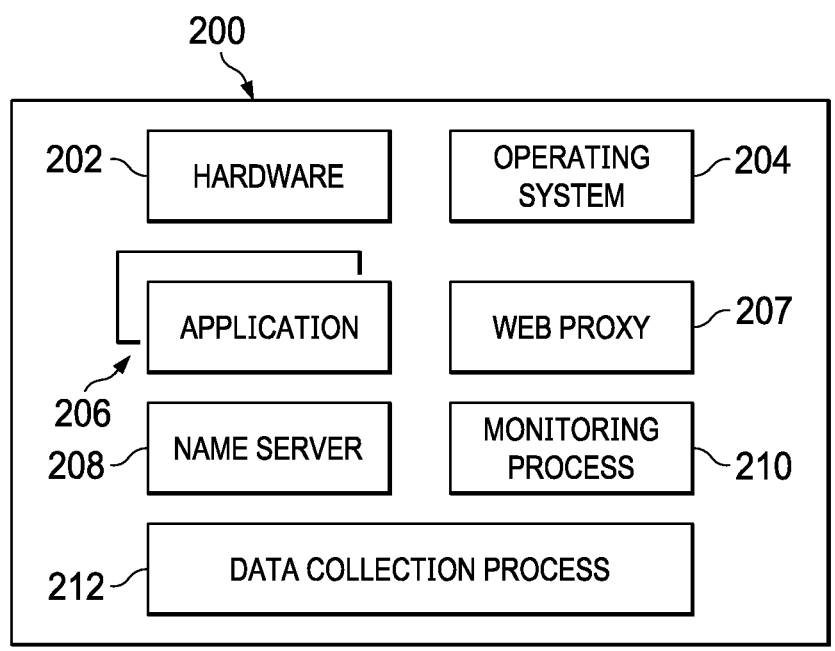
FIG. 2 is a representative CDN edge machine configuration.

As illustrated in FIG. 2, a given machine 200 in the content delivery network comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" or "ghost" process), a name server 208, a local monitoring process 210, a distributed data collection process 212, and the like. For streaming media, the machine may include one or more media servers, such as a Windows Media Server (WMS) or Flash server, as required by the supported media formats, or it may utilize HTTP-based delivery of chunked content fragments that constitute a stream.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Unified Browser-Based Enterprise Collaboration Platform Using an Overlay Network The following assumes familiarity with WebRTC.

According to this disclosure, an overlay network fabric is used to provide a unified browser-based enterprise collaboration platform. In particular, by distributing multiplexing and a relay infrastructure over a platform, such as a CDN (as described above), a solution that facilitates multi-user is provided but without requiring full mesh connectivity. While a primary use case as described below is for high-quality video conferencing that is scalable to large numbers of users, this is not a limitation, as the cloud-supported multiplexing and relay techniques herein may be used to provide other multi-user collaboration, such as chat, document sharing, and desktop sharing, all in a seamless and scalable manner. The overlay network can also provide additional functions and features to support a collaboration session; as described below, these may include, without limitation, persistent storage and recording of sessions and documents, integration with existing videoconferencing and telecommunications infrastructure (LifeSize rooms, PSTN, etc.), management, and others.

Figure 3:
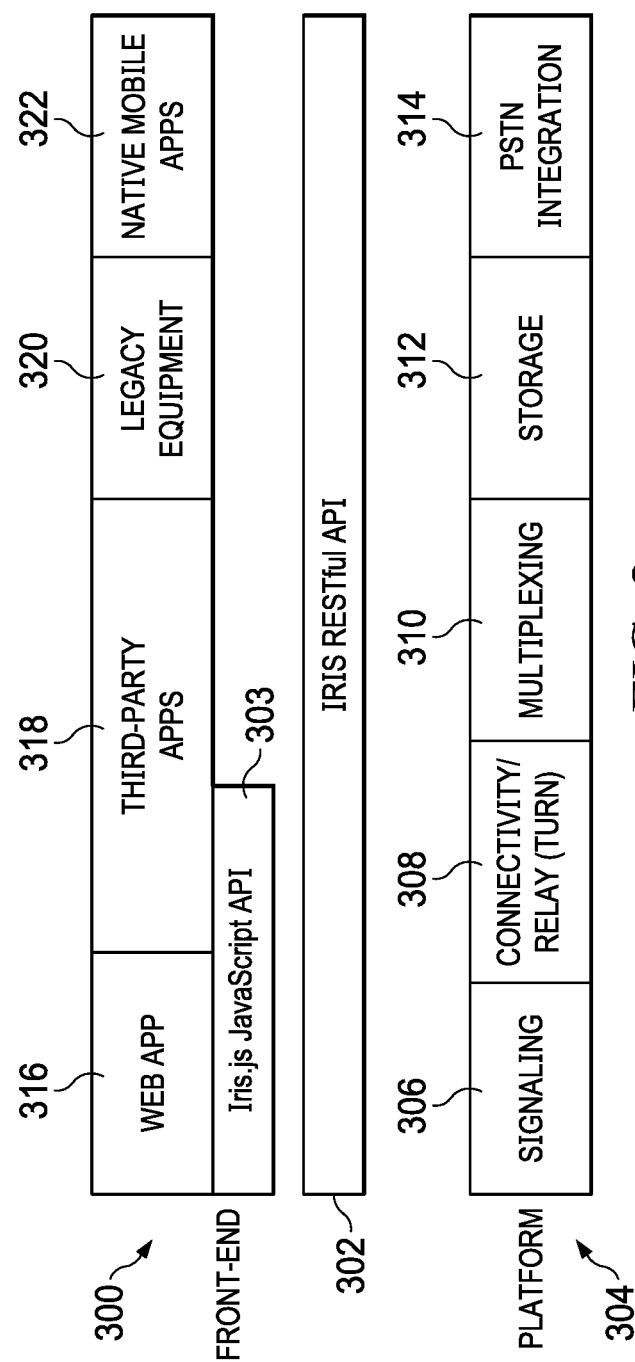
FIG. 3 depicts the various components of a web-based collaboration solution according to this disclosure.

FIG. 3 depicts a representative architecture 300 for an enterprise collaboration platform using an overlay network according to an aspect of this disclosure. There are three primary elements: a front-end application 300, RESTful APIs 302, and a back-end or platform 304. The front-end application (app) 300 preferably is built on a number of components (described below) that are preferably accessed through the one or more RESTful APIs 302. As will be seen, this architecture allows on-premises infrastructure to be integrated with the solution, and it could also be used to allow third parties to create applications powered by the platform. The platform components 304 include signaling 306, connectivity 308, multiplexing 310, storage 312, and PSTN integration 314. In one embodiment, the platform 304 comprises part of an overlay network (or leverages elements thereof), but this is not a requirement, as the solution herein may be provided as a standalone architecture. Further, the notion of a "component" herein may involve multiple machines, whether co-located or distributed, as well as the processes and programs executing thereon.

Turning first to the platform, the signaling component 306 preferably is a distributed signaling system that keeps track of users' state (e.g., "Online", "Away", "Busy", etc.), and it is used to transmit the information (i.e., SDP) necessary to initiate an RTCPeerConnection. The signaling component 306 preferably integrates with various user authentication and identity management solutions, although this is not a requirement. The connectivity component 308 manages video, voice and data connections routed though the overlay network platform to handle Network Access Translation (NAT) traversal, as well as to provide enhanced performance and security.

The multiplexing component 310 comprises multiplexing machines to allow for scalable, multi-peer sessions. This component makes it so that each peer only needs to upload its media stream once. Other peers are then able to access peers' media streams through overlay network edge machines (rather than by direct connections to peers). The multiplexing component provides for multiplexing in the cloud to significantly reduce edge bandwidth requirements that would otherwise be required to support WebRTC (which otherwise dictates a new connection be setup for pair of peers in a multi-user collaboration). With this approach herein of using the overlay network, there is no requirement to setup a new connection for each pair of peers in a multi-peer collaboration (conference, chat, etc.) session.

As will be described, and as a further feature, preferably the multiplexing component 310 intelligently adjusts the quality of different users' streams to enhance performance— e.g., only deliver HD streams for people who are currently speaking, deliver lower-quality streams to mobile devices, etc.

The storage component 312 allows overlay network customers to (optionally) store data from a collaboration session (e.g., record a meeting, save work on a collaborative document, etc.). The PSTN integration component 314 allows users to join sessions from the PSTN and legacy telecommunications equipment, and it allows users to call out over the PSTN. Although not depicted, the platform may include a transcoding component that allows for communications between browsers that do not have the same video codecs implemented, and for one-way broadcasting to browsers that do not support WebRTC.

As noted, the front-end components 300 interact with the back-end platform 304 using an application programming interface, such as RESTful APIs 302. These APIs 302 provide methods for exchanging SDPs to set up calls, provide information on which chat rooms are available, which media streams are available in each chat room, which user media streams in a given chat room are most "relevant" at any given moment, and so forth. The APIs preferably also provide methods for interacting with other parts of the back-end, e.g., verifying users' identities, accessing storage (saving data, retrieving data, searching), and the like. As also depicted, the APIs also preferably include a JavaScript (JS) API 303, referred to herein as "iris.js," which is a thin layer on top of the base WebRTC API and other HTML5 components. The iris.js API 303 preferably uses the other RESTful APIs to integrate with the overlay network fabric. In particular, the iris.js API allows applications to establish and use video, voice, and data channels. Preferably, the front-end web app is built on the JavaScript API, and third party applications may use this API to build apps that seamlessly integrate with the platform.

The front-end components 300 comprise a web application (or web app) 316, which is a unified communication tool built on iris.js. The web app 316 routes video, voice, and data through the overlay network fabric. The web app also provides (or interfaces to) one or more collaboration functions or technologies, such as video chat, collaborative document editing, desktop sharing, and the like. Because the web app 316 preferably is built in an API (such as iris.js 303, which can support several data channels), it is easily extensible. Thus, users are able to choose which voice, video, and data channels to connect to for a given session—for example, several users in a video conference room could use the room's camera and mic for videoconferencing with a remote site, but each individual user might use his or her personal laptop to edit a shared document. Preferably, the web app 316 is skinnable so it can be rebranded and used by enterprise customers. As noted, because iris.js is built on top of the WebRTC API's, third parties are able to easily adapt existing WebRTC applications to use the solution described herein. The third party applications 318 are depicted here as part of the front-end, but they may be separate and distinct. As noted above, the RESTful API 302 also makes integration with other collaboration tools possible. As also depicted, the front end may include or have associated therewith legacy on-premises equipment 320, such as Life-Size rooms. Further, the front-end may include or have associated therewith native mobile apps 322, such as devices and tablets that run native iOS and Android apps (as opposed to HTML5 apps in mobile browsers, which are also supported). The API layer 302 enables a service provider or third parties to easily build native mobile applications for the solution.

Figure 4:
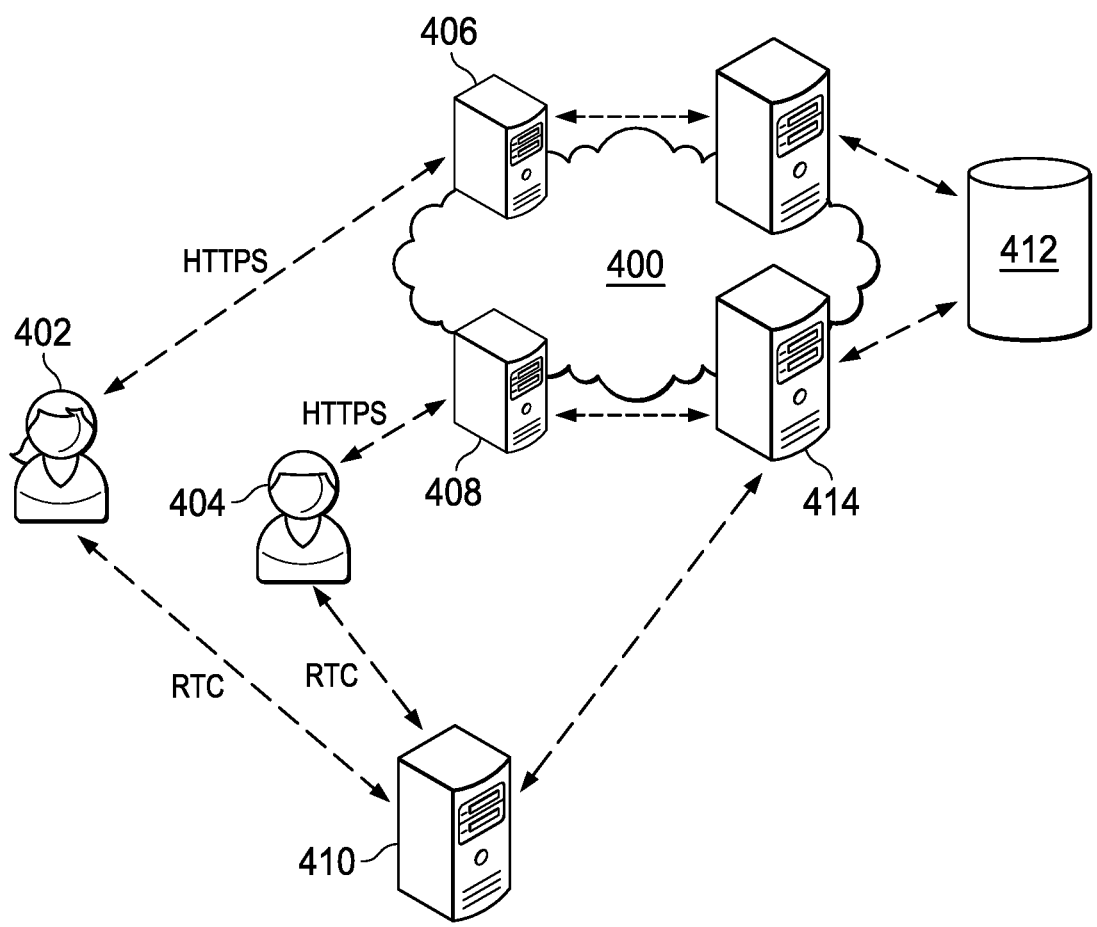
FIG. 4 illustrates a multi-party videoconference setup that is enabled by associating the web-based solution of this disclosure with an overlay network.

In one embodiment, the above-described solution provides a multi-party voice and video chat system. FIG. 4 depicts further implementation details of a multi-party solution implemented within an overlay network 400, such as the Akamai content delivery network (CDN). As depicted, there are two end user peers 402 and 404, and each peer is associated (e.g., using conventional CDN DNS mapping operations) to respective edge servers 406 and 408. Each peer also establishes a WebRTC connection to a media server 410 that hosts the videoconference (in this example scenario). A signaling back-end is powered by a distributed data store 412. In an example implementation, the platform is implemented using a combination of Node.js, PHP, Apache, Cassandra, and Kurento Media server running on Ubuntu Linux machines. Cassandra data is accessed via the RESTful API, which is powered by Node.js running behind an Apache proxy 414. In this approach, signaling information is exchanged via HTTPS interactions using the RESTful API. Multiplexing is accomplished using the Kurento Media Server (KMS) running on cloud Ubuntu VMs running in geographically-distributed locations. In operation, the Node.js signaling application performs a DNS lookup to the CDN mapping to determine an optimal (in terms of one or more factors such as latency, loss, load, availability, reachability, etc.) media server to which as client should connect. Clients upload their live media stream via WebRTC to the chosen media server. The connection is set up by the signaling layer through the RESTful API. Other clients who wish to subscribe to that media stream connect to the same media server (via the signaling layer) and receive the stream.

While the approach shown in FIG. 4 is typical, it is not a limitation. In an alternative embodiment, the underlying network environment may allow for direct connectivity between peers. This requirement is met among users, for example, as long as peers are connected to an enterprise VPN. Another approach is to use STUN and TURN servers (such as coturn) that run, for example, on cloud virtual machine (VM) infrastructure. In still another embodiment, a TURN-compliant version of a relay network for peer-to-peer connectivity may be used. In the multi-party case described above, STUN and TURN are not needed because it is assumed that clients can connect directly to multiplexing servers. Still another approach to connectivity may involve a multicast overlay network to distribute streams.

In this example implementation, the API is powered by a Node.js web application. The Node.js application interacts with Kurento Media Server and Cassandra to orchestrate calls. The "iris.js" JavaScript API is a client-side ECMAScript 6 library that allows web applications to interact with the system via the Iris RESTful API. It contains functionality that allows for easy WebRTC connection management, call orchestration, and automatic, dynamic quality switching, e.g., as the relevancy of different participants in a room changes. The web application is an HTML5 Web App written on top of iris.js. The views are powered by a PHP application.

The overlay network provides various support services to the conferencing platform. Thus, e.g., these services provide one or more of: deployment, versioning, integration with back-end overlay network infrastructure (key management), load balancing, monitoring, single sign-on, auto-scaling, and so forth.

With 1:1 conferencing, underlying media sessions preferably are end-to-end encrypted. For multi-party conferences, media sessions are encrypted between users' clients and the overlay network.

Any Internet-accessible client may be used in a conference provided it has a video camera and microphone/speaker.

As has been described, the solution is a video and audio conversation platform that does not require any special equipment other than a client having a browser, a webcam, and a microphone. The service provider (e.g., a CDN) preferably provides (e.g., from a web page) a "lobby" or index/directory from which a user can identify or start a conference. By opening his or her browser to the lobby page, a user can create a room (conference), join the room, see who is already in the room, change his or her relevancy (make your own video bigger relative to others), mute others, and mute yourself. In addition, the user may be provided the ability to communicate (with other users) that are within the same domain, set download quality, set upload quality, update a room, delete a room, leave feedback (when the user leaves the room), use a non-standard camera, see who created each room, and provide room deep linking (using SSO). A further feature is to enable the user to create a presentation.

In the lobby, the rooms may be organized by type, and it may be created programmatically. The person who creates the room may have his or her identity identified, and this information may be captured from a user authentication token. A room may be modified by a person who creates the room. The person may whitelist or blacklist users in a room. A default scenario is to allow no one to join a room except for persons that are explicitly allowed by the room creator via a whitelist.

Presentations allow for another type of room type. These types of rooms allow 1-to-many communications. In a standard multi-party room, every participant sees and hears everyone else. In contrast, typically a presentation has one presenter, one moderator, and a number of participants. A participant can raise a question, typically first to the moderator, who may then pass the question (if approved) on to the presenter. A room control panel may be provided to the presenter in his or her display. A participant control panel may be provided to the participant is his or her display.

Client-side JavaScript code may be subject to tampering; thus, to improve security preferably all server-side inputs (including URL parameters) are scrubbed and validated. To discourage brute-force attacks, a server-side delay is added to failed authentication attempts. To prevent a guess as to when an extended delay indicates a failed request, even successful authentication attempts are subjected to short delays. Some randomness may be added to both delay types.

Preferably, user passwords are salted, and user passwords are encrypted before leaving the clients. Content is secured by virtue of the WebRTC transport. Authentication preferably is handled via token-based authentication. Client JavaScript preferably is minified (removing unnecessary white spaces, etc.) and uglified (renames variables and functions).

Other variants and extensions may be implemented. These include room and lobby chat, file sharing, e-mail/calendar integration, screen sharing, vanity rooms, anonymous-access rooms (including one-time invites to outside users), scaling, and look and feel changes. Scaling involves multiple media servers, such as the KMS. Scaling enhancements involve uploading each stream to its own media server, and sending streams from one media server to another. The latter technique enables the provider to insert an intermediary stream layer to facilitate fan-out.

Generalizing, the collaboration session management functions described above may be accessed by an authenticated and authorized user (e.g., an administrator) via a secure web-based portal that is provided by the overlay network service provider. In a representative embodiment, the collaboration management functions are configured and managed from one or more SSL-secured web pages that comprise a secure collaboration session management portal.

The technique described herein assumes that the overlay network provides a network of machines capable of ingress, forwarding, and broadcasting traffic, together with a mapping infrastructure that keeps track of the load, connectivity, location, etc., of each machine and can hand this information back to clients using DNS or HTTPS. An approach of this type is described in U.S. Pat. Nos. 6,665,726 and 6,751,673, assigned to Akamai Technologies, Inc., the disclosures of which are incorporated herein. The technique described there provides for an application layer-over-IP routing solution (or "OIP routing").

The multiplexing component (of the back-end application) implements or facilitates multicast OIP to distribute individuals' video streams in a multiparty videoconference. Multicast OIP could may also be used as a generic real-time publish-subscribe overlay network or for broadcast of video in real-time.

In this approach, a publisher (which may be just an individual user) sends data to the multicast network. Clients (e.g., end user peers running mobile devices, laptops, etc.) subscribe to this data stream. The overlay network handles intelligently routing and fanning-out the data stream to all subscribers. The forwarding network may use multiple paths, forward error correction, and the like to ensure the reliability and performance of the stream. Preferably, the intermediate communications also are encrypted.

The publisher and subscriber operations are now further described. To initiate the session, a publisher makes a DNS (or HTTPS) request to a load balancer operated by the overlay network service provider (e.g., Akamai global traffic manager service). The request preferably contains a unique identifier for the publisher's data stream. The load balancer finds an ingress node on the network that has available bandwidth, CPU, and other resources, and that will have good connectivity to the publisher (close by from a network perspective), and hands back an IP address (or URI) corresponding to that node. This is a known OIP operation. The publisher connects to the ingress node. Then, the publisher sends its data (e.g., a video stream generated by a webcam) to the ingress node. The overlay network handles distributing the video stream to subscribers. To obtain the stream, subscribers make a DNS (or HTTPS) request to mapping (overlay network DNS). This request contains the unique identifier of the data stream which the subscriber wants to consume. The mapping system finds an egress node that can deliver the stream to the subscriber, and hands back an IP address (or URI) for that egress node. If necessary, the system builds a fan-out tree by assigning forwarding nodes between the ingress and egress nodes. The system forwards data through the forwarding nodes to the egress nodes. The subscriber then connects to the IP/URI it got in the first step, and consumes the data stream.

A typical use case is WebRTC. In the WebRTC case, the ingress and egress nodes handle WebRTC PeerConnections. Subscribers to a given stream have individual WebRTC PeerConnections to individual egress nodes; the overlay system takes care of distributing the stream from the ingress nodes to the individual egress nodes.

Each above-described process preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs in conjunction with a DNS-compliant name server (e.g., BIND) on a standard Intel hardware platform running an operating system such as Linux. The functionality may be built into the name server code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The techniques herein generally provide for the above-described improvements to a technology or technical field, as well as the specific technological improvements to various fields including collaboration technologies including videoconferencing, chat, document sharing and the like, distributed networking, Internet-based overlays, WAN-based networking, efficient utilization of Internet links, and the like, all as described above.

Having described the subject matter, what is claimed now follows below.

The invention claimed is:

1. A system, comprising:
an overlay network, the overlay network comprising a video delivery infrastructure having network edge-based deployments comprising edge machines and a set of media servers; and
an apparatus to facilitate a multi-peer collaboration session wherein an end user peer accesses media streams of other peers through the overlay network rather than directly from another peer, the apparatus comprising:
a hardware processor;
computer memory associated with the hardware processor and holding computer program code configured as: (i) a signaling component that maintains state information about each peer participating in a collaboration, (ii) a connectivity component that manages connections routed through the overlay network and that support the collaboration, (iii) a multiplexing component that manages the multi-peer collaboration session, and (iv) a session manager that publishes one or more pages and receives control information entered by at least one user associated with a peer, thereby executing one or more management operations associated with the collaboration session;
wherein the one or more management operations include one of: creating or deleting a room, joining a room, viewing participants in a room, whitelisting or blacklisting participants for a room, adjusting a relevancy value of a media stream, muting or unmuting an audio stream, adjusting a quality of a media stream, providing feedback, adjusting equipment in a room, creating a presentation for a room, creating a vanity room, creating an anonymous access room, adjusting a look and feel of a room, enabling room-specific collaboration activities, and providing room deep-linking;
the overlay network configured to auto-scale the set of media servers of the video delivery infrastructure as needed to support the multi-peer collaboration.

2. The system as described in claim 1 wherein the collaboration session is one of: a videoconference, a chat, sharing a document, and sharing a desktop.

3. The system as described in claim 1 wherein the multiplexing component adjusts a quality of at least one media stream during the collaboration session.

4. The system as described in claim 1 further including a storage component to store data from the collaboration session.

5. The system as described in claim 1 further including a Public Switched Telephone Network (PSTN) integration component to allow participants to join the collaboration session from the PSTN network.

6. The system as described in claim 1 wherein media streams are received over the video delivery infrastructure in an encrypted form.

7. The system as described in claim 1 wherein the multi-peer collaboration session is a Web Real time Communications (WebRTC) session.

8. The system as described in claim 1 wherein each media stream associated with the multi-peer collaboration is associated with a given media server of the set of media servers.

9. The system as described in claim 1 wherein the overlay network comprises an intermediary layer of media servers to provide fan-out of the media streams.

* * * * *